Patented Nov. 17, 1925.

1,562,151

UNITED STATES PATENT OFFICE.

INEO DE VECCHIS, OF ROME, ITALY, ASSIGNOR TO HOME AND COLONIAL INVESTMENTS LIMITED, OF LONDON, ENGLAND.

PROCESS OF EXTRACTING SUGAR FROM BEETS.

No Drawing. Application filed December 5, 1923. Serial No. 678,782.

*To all whom it may concern:*

Be it known that I, INEO DE VECCHIS, subject of the King of Italy, residing at Galleria S. Marcella, Rome, Italy, have invented certain new and useful Improvements in Processes for Extracting Sugar from Beets, of which the following is a specification.

This invention relates to a process for extracting sugar from beets, and has for its object a process suitable both for large and small installations and which, being simpler and less costly than processes hitherto known, may be used directly by growers of beets.

It has already been proposed to dry and preserve beet cossets but without success for the reason that a low drying temperature of about 50° C. was employed, probably owing to the fear of altering the sugar.

While beets can be dried at 50° C., they remain hygroscopic owing to the low coagulation of the albuminoid substances and easily reabsorb moisture, thus becoming soft. Moreover germs which may easily cause fermentation or alteration in the mass of the cossets or of the juices survive the drying process and have an injurious effect so soon as the softening of the cossets offers a favourable locus for their activity.

When cossets are dried at a low temperature, it is known that their cellular walls tend to become impermeable to liquids, so that the process of osmosis becomes slower and more difficult than in the case of fresh beets; this tendency being termed the "pergamenoid" property of the cossets.

According to this invention the beets are cut into short thin fragments or cossets, which are dried and sterilized by a progressive heating to about 90–100° C., maintained at this temperature for about three hours and then stored.

The following results are obtained thereby:—

(1) The cossets are thoroughly dried and their cellular walls become frail and entirely lose their pergamenoid properties even after steeping in water.

(2) All albuminous substances are coagulated.

(3) They are completely sterilized owing to the destruction of microorganisms.

(4) Hygroscopicity is very substantially diminished.

(5) The sugar remains unaltered.

Cossets treated as above described may therefore be stored without special precautions and will keep for an almost indefinite period.

To make beet sugar, the dried cossets are lixiviated, whereby sugar juice is for the reasons stated under (1) rapidly obtained; the juice obtained being almost neutral and of high concentration (50–50° Brix and above) and considerably purer than that which would have been obtained by treating the same beets by the usual process of diffusion. This is of course owing to the coagulation of the complex albuminous substances which remain in the cossets whose nourishing properties are increased.

A small quantity of lime is added to the juices while at a temperature of 90–100° C., such addition being sufficient to give them an alkali content equal to that of the thick juices obtained in the usual processes; the less complex dissolved albuminoids are thereby precipitated.

The juices are then neutralized by the addition of monocalcic phosphate (or preferably superphosphate), after which powdered calcium carbonate (limestone) is added to form a filtering mass which allows good and rapid filtration and also serves to neutralize any excess of acidity.

It has already been proposed to employ phosphoric acid for deliming beet juices, but without practical success, either owing to its high cost or because filtration becomes more difficult and also because its use entails numerous other disadvantages.

The employment of commercial calcium superphosphate is economical in view of its low price; its use also offers considerable advantage as besides introducing the free phosphoric acid it contains, it also introduces insoluble calcium phosphate and calcium sulphate which in themselves form a good filtering mass, but whose filtering properties are still further improved by the addition of powdered calcium carbonate.

Purification can in this manner be effected with ease and certainty without chemical control.

By filtering the juice so treated hot in a filter press, a clear limpid very brilliant and almost neutral juice is obtained, the juice being as pure as that obtained in sugar factories by double carbonization and sulphitation.

Subsequent filtration through carbon allows a completely decolorized juice to be obtained which may be boiled and concentrated in vacuo just as well as the juices obtained in the usual manner.

This process also offers the advantage that the purified juices contain less calcium salts than the usual juices. The "melassigenic" or molasses-forming properties of such salts are known (they prevent crystallization of a portion of the sugar). A greater yield of crystallized sugar is thus obtained by the process carried out in accordance with this invention.

Defecation scums produced by undecomposed calcium carbonate, tricalcium phosphate, calcium sulphate and insoluble organic calcium compounds form, when united with coagulated albumins, a mass eminently suitable for filtration.

According to this invention, such scums are, without any washing, employed in the subsequent operations in place of calcium carbonate, of course so far as consistent with their impurity content, after which the carbonate treatment is recommenced.

The scums which have become unserviceable for filtration form an excellent manure, for they contain, besides calcium phosphate in a state of fine division and therefore easily and properly assimilable by plants, a good percentage of nitrogenous organic matters.

The volume of the residues is thus substantially reduced by the use of scums, thus forming a further advantage of the process; they are less by ⅓ than those obtained by the ordinary methods and in place of being 10% of the weight of the beets become 3%. Further, owing to their excellent fertilizing qualities, the scums, in place of forming a useless waste, are a by-product having a substantial commercial value; they are easily delivered, above all if the factory is installed in the best zone.

Subsequent treatments (boiling the syrup etc.) are effected in the known manners.

The process forming the object of the invention requires an expenditure in fuel moderately greater than that in large sugar factories which employ the usual method of defecation by liming, but the installation avoids the use:

(1) of the lime furnace and of apparatus for dissolving and pulverizing the lime, for washing carbonic acid and the suction pump.

(2) of filters, reheater and pump.

(3) of preheating apparatus and multiple effect concentrating apparatus.

(4) of pumps for the juices and condensed waters, while the vacuum pump may be of substantially smaller size.

(5) of an enormous quantity of water, motive power, handling and technical control.

The process is therefore suitable for small factories installed by cultivators of beets. Further, as the larger portion of fuel is absorbed by the initial phase of the operation (heating and drying the cossets), it allows the employment of any local fuel such as peaty lignite, wood, agrarian and other industrial waste products and completely eliminates the use of coal or limits it at most to the generation of steam (i. e. by at least ⅓ of the quantity required by sugar factories as at present installed.

I claim as my invention:—

1. In a process of extracting beet sugar, the steps of converting the beets into cossets; progressively heating the cossets to a temperature between 90–100° C. to dry and sterilize them; and maintaining such temperature for about 3 hours.

2. In a process of extracting beet sugar, the steps of converting the beets into cossets; heating the cossets to a temperature sufficient to completely dry and sterilize them; lixiviating the dried cossets to obtain a highly-concentrated, almost neutral sugar juice; and adding lime to said juice to render it alkaline and precipitate the less complex dissolved albumenoids.

3. In a process of extracting beet sugar, the steps of converting the beets into cossets; heating the cossets to a temperature sufficient to dry and sterilize them; lixiviating the dried cossets to obtain a highly-concentrated, almost neutral sugar juice; adding lime to said juice to render it alkaline and precipitate the less complex dissolved albumenoids; successively adding calcium superphosphate and powdered limestone to the juice to form a neutralized filtering mass; and then filtering the juice so treated.

4. In a process of extracting beet sugar, the steps of converting the beets into cossets; heating the cossets to a temperature sufficient to dry and sterilize them; lixiviating the dried cossets to obtain a highly-concentrated, almost neutral sugar juice; adding lime to said juice to render it alkaline and precipitate the less complex dissolved albumenoids; adding calcium superphosphate to the juice to neutralize it; and then filtering the neutralized juice.

In testimony whereof I affix my signature.

INEO DE VECCHIS.